United States Patent Office 3,036,038
Patented May 22, 1962

3,036,038
PHTHALIDEIN-POLYCARBONATE RESINS
Joseph H. Howe, Freeland, Mich., assignor to The Dow Chemical Company, Midland, Mich., a corporation of Delaware
No Drawing. Filed May 31, 1960, Ser. No. 32,612
7 Claims. (Cl. 260—47)

This invention relates to a new and useful class of resinous polycarbonate materials. More particularly the present invention concerns polycarbonate resins having improved physical and chemical properties not exhibited by the conventional polycarbonate resins.

Polycarbonate resins have been known to the plastics art for some time. These resins are notably tough and rigid and have high melting points. For some purposes however, it is necessary to have plastics of even higher melting points than are exhibited by conventional polycarbonate resins while retaining good rigidity, toughness, and other desirable properties.

It is among the objects of the present invention to provide a new polycarbonate resin having improved chemical and physical properties.

A further object of the present invention is the provision of a unique class of polycarbonate resins having high molecular weights and high melting points.

Another object of the present invention is the provision of a polycarbonate resin having excellent resistance to dry cleaning solvents and high heat distortion temperatures.

A further object of the present invention is to produce polycarbonate resins of fiber and film forming quality and having low static accumulation.

Other objects and advantages of this invention will be evident in the following description.

It has now been found that the above objects are attained in a polycarbonate resin containing in the polymer chain the residues obtainable by removing hydroxyl hydrogens from phthalidein. The new resins have recurring units corresponding to the structure

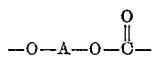

wherein —O—A—O— represents the divalent residue obtainable by removing the hydroxyl hydrogens from phthalidein. A polymer of the structure

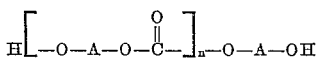

in which —O—A—O— represents the divalent residue above defined and $n$ is a positive integer greater than 20, and preferably greater than 40, can be made by the phosgenation of phthalidein. According to the present invention copolymers having divalent residues formable by removing the hydroxyl hydrogens from phthalidein and from difunctional organic dihydroxy compounds other than phthalidein have desirable properties attributable to the presence of the residues of phthalidein. These latter polymers have recurring units corresponding to the structure

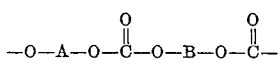

in which —O—B—O— is the divalent residue which can be obtained by removing hydroxyl hydrogens from difunctional organic dihydroxy compounds free of aliphatic unsaturation other than phthalidein.

Phthalidein is described in Adolph von Baeyer's Gesammelte Werke (1905) and has the structure:

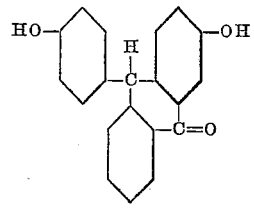

In general the polymers of this invention can contain in addition to the residues of phthalidein, residues obtained by the removal of the hydroxyl hydrogens from other difunctional organic dihydroxy compounds free of aliphatic unsaturation. These dihydroxy compounds can be aromatic, aliphatic or cycloaliphatic, as for example, hydroquinone, 4,4'-dihydroxydiphenyl, ethylene glycol, alpha-propylene glycol, 1,4-cyclohexanediol, 1,3-cyclopentanediol, hexamethylene glycol, decamethylene glycol and the like.

The dihydroxy compounds useable with phthalidein to make the polycarbonate resins of this invention include aralkyl, alkaryl, and hetero compounds, representative examples of which are: 4,4'-isopropylidenediphenol, 4,4'-cyclohexylidenediphenol, 4,4'-methylenediphenol, 4,4'-isopropylidene-o-cresol, 4,4'-isopropylidenebis(2-phenylphenol), 4,4'-isopropylidenebis(2-tert-butylphenol), 4,4'-sulfonyldiphenol, 4,4'-oxydiphenol, triethylene glycol, and dipropylene glycol. Halogenated polycarbonate forming derivatives of these compounds can also be used in conjunction with phthalidein to make the resins of the present invention.

Polymers of this invention can be made by phosgenating phthalidein in the presence or absence of one or more other dihydroxy compounds of the type indicated above. Alternatively, phthalidein can be reacted with the bis(chloroformate) derivatives of one or more of the above indicated other dihydroxy compounds to produce the polymers of the present invention.

The following examples are illustrative of the present invention but the invention is not limited thereto. Parts and percentages are by weight unless otherwise indicated.

*Example I*

A sample of 3.3 grams of 4,4'-isopropylidenediphenol bis(chloroformate) in 100 milliliters of methylene chloride is added to 2.58 grams of phthalidein, 1.46 grams of sodium bicarbonate, 10 milliliters of 5 percent aqueous sodium hydroxide, 3 milliliters of 3 percent benzyltrimethylammonium chloride and 80 milliliters of water. The mixture is stirred for ½ hour with a high-speed mixer at room temperature resulting in an emulsion. Stirring is continued for an additional hour during which time 5 percent aqueous sodium hydroxide is added dropwise to maintain the mixture alkaline. On standing overnight at room temperature the mixture separates into two layers. The supernatant aqueous layer is decanted and the methylene chloride portion is the extracted with slightly alkaline water. The methylene chloride portion is then added dropwise to 1 liter of 95 percent ethyl alcohol which is constantly stirred. The precipitate thus formed is recovered by filtration and is further purified by washing, precipitation from solution and drying. The product has a molecular weight in excess of 10,000 a high melting point and is stable at temperatures above its melting point. Fibers drawn from a melt of the polymer can be made into textiles. Films cast from a solution of the polymer have low static accumulation. These films are not adversely affected by water, 5 percent aqueous sodium hydroxide and carbon tetrachloride.

Example II

To 1.55 grams of 4,4'-isopropylidenediphenol, 1.43 grams of sodium bicarbonate, 0.51 gram of phthalidein, 10 milliliters of 5 percent aqueous sodium hydroxide, and 3 milliliters of 3 percent aqueous benzyltrimethylammonium chloride dissolved in 85 milliliters of water, is added 2.97 grams 4,4'-isopropylidenediphenolbis(chloroformate) dissolved in 85 milliliters of methylene chloride. The mixture is stirred vigorously for one hour during which time 5 percent aqueous sodium hydroxide is added dropwise to maintain the reaction mixture alkaline. After standing overnight at room temperature the mixture separates into two layers. The supernatant aqueous layer is decanted and the methylene chloride portion is extracted with water. The methylene chloride portion is then added dropwise to 500 milliliters of 95 percent ethyl alcohol to precipitate the polymer. The polymer is recovered by filtration followed by vacuum drying. This polymer has a high melting point and a high heat distortion temperature. Good fibers can be pulled from a melt of this polymer.

Example III

To 1.97 grams of diethylene glycol bis(chloroformate) dissolved in 80 milliliters of methylene chloride are added 2.54 grams of phthalidein, 1.43 grams of sodium bicarbonate, 10 milliliters of 5 percent aqueous sodium hydroxide, 3 milliliters of 3 percent aqueous benzyltrimethylammonium chloride and 80 milliliters of water. The reaction mixture is stirred for two hours during which time 5 percent aqueous sodium hydroxide is added dropwise to maintain the reaction mixture alkaline. The methylene chloride layer is separated from the aqueous layer and added dropwise to 500 milliliters of 95 percent ethyl alcohol to precipitate the polymer. The precipitate is recovered by filtration after washing and is washed and dried. This polymer has a high melting point and a molecular weight in excess of 10,000. A 3.5 denier fiber pulled from a melt of this polymer has good tenacity and can be made into screens, netting, and other useful articles.

Example IV

A charge of 2.13 grams of 4,4'-sulfonyldiphenol, 2.54 grams of phthalidein, 80 milliliters of water and 2.1 grams of sodium hydroxide is placed in a 250 milliliter beaker. With moderate stirring, phosgene, at room temperature, is introduced through a sparger into the reaction mixture for ¾ hour. The reaction mixture is then placed in a 500 milliliter flask equipped with a paddle stirrer. There are then added 150 milliliters of methylene chloride and 3.4 milliliters of a 3 percent aqueous solution of benzyltrimethylammonium chloride. The mixture is stirred rapidly while 10 milliliters of 10 percent aqueous sodium hydroxide are added at the rate of ½ milliliter per minute. Stirring is continued for an additional 2 hours and 10 minutes. The methylene chloride layer is separated from the aqueous layer and the latter is acidified and extracted with methylene chloride. The extract is added to the methylene chloride previously separated. This product is washed with dilute acid, and added dropwise to 500 milliliters of 95 percent ethanol to give a precipitate. The precipitate is recovered by filtration and is then washed and dried. This copolymer has a high melting point. Fibers are pulled from a melt of this polymer and are knit into useful products.

Example V

The procedure of Example IV is repeated substituting 2,4'-sulfonyldiphenol for the 4,4'-sulfonyldiphenol. This copolymer has a molecular weight in excess of 10,000 and a high melting point. Fibers and films can be made from the copolymer of this example.

Example VI

A sample of 363 grams of phthalidein and 144 grams of sodium hydroxide are dissolved in 4800 milliliters of water contained in a 20 liter jar equipped with a paddle stirrer. A total of 200 grams of phosgene are bubbled into the solution at the rate of about 3.8 grams per minute. The solution is stirred rapidly during the introduction of the phosgene. Methylene chloride (1800 milliliters) is then added with stirring. On standing the contents of the jar separate into two layers. The supernatant water layer is decanted and the remaining methylene chloride layer is washed with 4000 milliliters of water. There are then added with stirring 6 milliliters of 80 percent aqueous benzyltrimethylammonium chloride, 2080 milliliters of water and 37 grams of sodium hydroxide. Stirring is continued for an hour and a half. On standing overnight at room temperature, the emulsion thus formed separates into an upper aqueous layer and a lower methylene chloride layer. The aqueous layer is decanted. The methylene chloride layer is washed with slightly alkaline water, acidified with concentrated hydrochloric acid, again water washed. The polymer is precipitated by pouring the methylene chloride solution into a large volume of 95 percent ethanol. The precipitate obtained is recovered by filtration and vacuum dried. This phthalidein-polycarbonate resin can be extruded to form rods, tubing, strips, and the like.

Fibers made from the polymers and copolymers of this invention exhibit no appreciable change in tenacity when soaked in 1,1,2,2-tetrachloroethane or carbon tetrachloride for 30 minutes and then air dried for 15 minutes at 100° C., whereas fibers from other polycarbonate resins lose half of their tenacity under such treatment. Similarly fibers made from polymers and copolymers of this invention show no appreciable change in tenacity by being soaked for 1 hour in 1.5 percent aqueous sodium carbonate at 92° C. followed by water washing and drying at 100° C. for 30 minutes. The polymers and copolymers of the present invention have higher heat distortion temperatures than polycarbonate resins commercially available at the present time.

The polymers and copolymers of this invention can be mixed with dyes, delusterants, pigments, fillers, reinforcing materials and other polymers. They can be fabricated into useful articles such as films, fibers, tubes, rods and the like from a melt or solution thereof by conventional shaping techniques such as molding, casting, and extruding. The resins can also be used as protective or decorative coatings and to make laminates such as safety glass.

That which is claimed is:

1. A polycarbonate resin having in the polymer molecule units of the structure

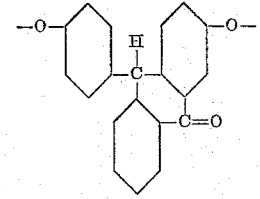

in which the hexagons represent benzene rings.

2. A polycarbonate resin having the formula

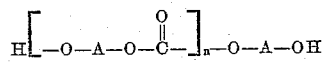

in which —O—A—O— represents residues obtainable by removing hydroxyl hydrogens from phthalidein and $n$ is a positive integer greater than 20.

3. A polycarbonate resin having in the polymer molecule units of the structure

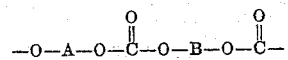

in which —O—A—O— represents residues obtainable by removing hydroxyl hydrogens from phthalidein and —O—B—O— represents residues obtainable by removing hydroxyl hydrogens from difunctional organic dihydroxy compounds free of aliphatic unsaturation.

4. A polycarbonate resin according to claim 3 in which —O—B—O— is the residue obtainable by removing the hydroxyl hydrogens from 4,4′-isopropylidenediphenol.

5. A polycarbonate resin according to claim 3 in which —O—B—O— is the residue obtainable by removing the hydroxyl hydrogens from 4,4′-sulfonyldiphenol.

6. A polycarbonate resin according to claim 3 in which —O—B—O— is the residue obtainable by removing the hydroxyl hydrogens from 2,4′-sulfonyldiphenol.

7. A polycarbonate resin according to claim 3 in which —O—B—O— is the residue obtainable by removing the hydroxyl hydrogens from diethylene glycol.

References Cited in the file of this patent

UNITED STATES PATENTS 2,035,578   Wagner ---------------- Mar. 31, 1936